(12) United States Patent
Cederberg et al.

(10) Patent No.: US 12,169,046 B2
(45) Date of Patent: Dec. 17, 2024

(54) COMPOSITE INTERWOVEN GAS CONTAINMENT ASSEMBLIES

(71) Applicant: Agility Fuel Systems LLC, Costa Mesa, CA (US)

(72) Inventors: Chad Alvin Cederberg, Lincoln, NE (US); Ken C. Halvorsen, Lincoln, NE (US); Bradley J. Moutray, Omaha, NE (US); Brian C. Yeggy, Lincoln, NE (US)

(73) Assignee: Agility Fuel Systems LLC, Costa Mesa, CA (US)

( * ) Notice: Subject to any disclaimer, the term of this patent is extended or adjusted under 35 U.S.C. 154(b) by 0 days.

(21) Appl. No.: 18/490,647

(22) Filed: Oct. 19, 2023

(65) Prior Publication Data

US 2024/0044452 A1 Feb. 8, 2024

Related U.S. Application Data

(63) Continuation of application No. PCT/US2022/027890, filed on May 5, 2022.
(Continued)

(51) Int. Cl.
*F17C 1/06* (2006.01)

(52) U.S. Cl.
CPC ........ *F17C 1/06* (2013.01); *F17C 2201/0109* (2013.01); *F17C 2203/0604* (2013.01); *F17C 2203/067* (2013.01); *F17C 2209/2163* (2013.01)

(58) Field of Classification Search
CPC ............... F17C 1/06; F17C 2201/0109; F17C 2203/0604; F17C 2203/067;
(Continued)

(56) References Cited

U.S. PATENT DOCUMENTS 2,479,828 A 8/1949 Geckler
2,723,705 A 11/1955 Collins
(Continued)

FOREIGN PATENT DOCUMENTS

DE 10 2017 208492 11/2018
EP 1 574 320 B1 10/2008
(Continued)

OTHER PUBLICATIONS

English Machine Translation of JP-2010265931-A (Year: 2010).*
(Continued)

*Primary Examiner* — Don M Anderson
*Assistant Examiner* — Laura E. Parker
(74) *Attorney, Agent, or Firm* — Knobbe, Martens, Olson & Bear, LLP (57) ABSTRACT

A pressure vessel is provided that has a structural shell formed by winding filaments upon a substantially cylindrical form. The structural shell has a first filament and a second filament. The first filament includes of a first material. The first filament is wound about the form in a primarily hoop direction. The second filament includes a second material. The second material is different from the first material. The second filament is wound about the form in a primarily helical direction. The first filament and second filament are interwoven in a layer upon the form.

27 Claims, 7 Drawing Sheets

Related U.S. Application Data (60) Provisional application No. 63/201,667, filed on May 7, 2021.

(58) Field of Classification Search
CPC ...... F17C 2209/2163; F17C 2203/0663; F17C 2203/0656; F17C 2203/0658; F17C 2203/066; F17C 2203/0665; F17C 2203/0668; F17C 2203/0673
USPC ........................................................ 220/589
See application file for complete search history.

(56) References Cited

U.S. PATENT DOCUMENTS

| | | | |
|---|---|---|---|
| 3,312,575 | A | 4/1967 | Corbin, Jr. |
| 3,321,347 | A | 5/1967 | Price et al. |
| 3,669,816 | A | 6/1972 | Smith |
| 3,795,573 | A | 3/1974 | Smith et al. |
| 3,843,010 | A | 10/1974 | Morse et al. |
| 4,191,304 | A | 3/1980 | Schiedat |
| 4,438,858 | A | 3/1984 | Grover |
| 4,660,738 | A | 4/1987 | Ives |
| 4,760,949 | A | 8/1988 | Elias |
| 5,150,812 | A | 9/1992 | Adams |
| 5,287,987 | A | 2/1994 | Gaiser |
| 5,287,988 | A | 2/1994 | Murray |
| 5,368,184 | A | 11/1994 | Fay et al. |
| 5,419,139 | A | 5/1995 | Blum et al. |
| 5,499,739 | A | 3/1996 | Greist, III et al. |
| 5,567,296 | A | 10/1996 | Luch |
| 5,577,630 | A | 11/1996 | Blair |
| 5,758,796 | A * | 6/1998 | Nishimura ............... F17C 1/06 220/651 |
| 5,798,156 | A | 8/1998 | Mitkitsky |
| 5,822,838 | A | 10/1998 | Seal et al. |
| 6,145,692 | A | 11/2000 | Cherevatsky |
| 6,510,961 | B1 | 1/2003 | Head et al. |
| 6,630,529 | B2 | 10/2003 | Robichaud |
| 6,708,502 | B1 | 3/2004 | Aceves |
| 7,208,207 | B2 | 4/2007 | Ono et al. |
| 7,211,307 | B2 | 5/2007 | Potter et al. |
| 7,641,949 | B2 | 1/2010 | DeLay et al. |
| 7,735,536 | B2 | 6/2010 | Mukai et al. |
| 7,743,940 | B2 | 6/2010 | Brunnhofer |
| 7,810,754 | B2 | 10/2010 | Uozumi et al. |
| 7,815,141 | B2 | 10/2010 | Uozumi et al. |
| 7,832,235 | B2 | 11/2010 | Neubert et al. |
| 7,905,442 | B2 | 3/2011 | Uozumi et al. |
| 8,048,248 | B2 | 11/2011 | Neubert |
| 8,074,826 | B2 | 12/2011 | Cronin et al. |
| 8,113,457 | B2 | 2/2012 | Tanigawa et al. |
| 8,308,017 | B2 | 11/2012 | Schlag |
| 8,313,595 | B2 | 11/2012 | Blanc et al. |
| 9,011,622 | B2 | 4/2015 | Radtke |
| 9,074,685 | B2 | 7/2015 | Strack et al. |
| 9,156,202 | B2 | 10/2015 | Tanigawa et al. |
| 9,302,437 | B2 | 4/2016 | Radtke |
| 9,545,770 | B2 | 1/2017 | Miller |
| 9,688,508 | B2 | 6/2017 | Tanigawa et al. |
| 10,287,052 | B2 | 5/2019 | Vanswijgenhoven |
| 10,641,431 | B2 | 5/2020 | Mallick et al. |
| 10,737,445 | B1 | 8/2020 | Kayhart et al. |
| 10,823,333 | B2 | 11/2020 | Criel et al. |
| 11,015,762 | B2 | 5/2021 | Mauieu et al. |
| 11,312,229 | B1 | 4/2022 | Yordanov et al. |
| 11,440,399 | B2 | 9/2022 | Yordanov et al. |
| 11,560,982 | B2 | 1/2023 | Volkmer et al. |
| 11,828,417 | B2 * | 11/2023 | Clarke ................... B64D 37/30 |
| 11,940,098 | B2 | 3/2024 | Volkmer et al. |
| 2002/0041823 | A1 | 4/2002 | Blaszczyk |
| 2002/0053573 | A1 | 5/2002 | Bowen et al. |
| 2004/0056390 | A1 | 3/2004 | Yeh |
| 2005/0077643 | A1 * | 4/2005 | Matsuoka ................. F17C 1/16 264/258 |
| 2005/0191435 | A1 | 9/2005 | Bauman |
| 2009/0057319 | A1 | 3/2009 | Schlag |
| 2009/0308874 | A1 | 12/2009 | Lindner |
| 2011/0210475 | A1 | 9/2011 | Strack et al. |
| 2011/0220660 | A1 | 9/2011 | Strack |
| 2011/0304083 | A1 | 12/2011 | Strack |
| 2012/0024745 | A1 | 2/2012 | Otsuka et al. |
| 2012/0214088 | A1 | 8/2012 | Breuer |
| 2013/0299504 | A1 | 11/2013 | Koppert |
| 2013/0313266 | A1 | 11/2013 | Andernach et al. |
| 2014/0008373 | A1 | 1/2014 | Sharp et al. |
| 2014/0272670 | A1 | 9/2014 | Strack |
| 2015/0044407 | A1 | 2/2015 | Som et al. |
| 2015/0096994 | A1 | 4/2015 | Radtke |
| 2015/0192251 | A1 | 7/2015 | Tupper et al. |
| 2015/0240993 | A1 | 8/2015 | DeLay |
| 2016/0082910 | A1 | 3/2016 | Sloan et al. |
| 2017/0045181 | A1 * | 2/2017 | Watanabe ............... B29C 70/32 |
| 2017/0101003 | A1 | 4/2017 | Zimmerman et al. |
| 2017/0282710 | A1 | 10/2017 | Sloan et al. |
| 2018/0080607 | A1 | 3/2018 | Van Haaren et al. |
| 2018/0093563 | A1 | 4/2018 | Matijevich |
| 2018/0231182 | A1 | 8/2018 | Posselt |
| 2019/0077109 | A1 | 3/2019 | Takemoto et al. |
| 2019/0111609 | A1 | 4/2019 | Van Nimwegen et al. |
| 2019/0170297 | A1 | 6/2019 | Criel et al. |
| 2020/0072415 | A1 * | 3/2020 | Kamiya ................. B65H 54/16 |
| 2020/0088299 | A1 | 3/2020 | Baumer et al. |
| 2020/0224823 | A1 * | 7/2020 | Hatta ...................... B29C 63/08 |
| 2020/0347992 | A1 | 11/2020 | Volkmer et al. |
| 2021/0088183 | A1 | 3/2021 | Middendorf |
| 2021/0123565 | A1 | 4/2021 | Kerforn et al. |
| 2021/0123568 | A1 | 4/2021 | Kronholz et al. |
| 2021/0138717 | A1 | 5/2021 | Iriyama |
| 2021/0310614 | A1 * | 10/2021 | Kamiya ................... F16J 12/00 |
| 2022/0048380 | A1 | 2/2022 | Yordanov et al. |
| 2022/0178495 | A1 | 6/2022 | Volkmer et al. |
| 2022/0203825 | A1 | 6/2022 | Volkmer et al. |
| 2023/0358365 | A1 | 11/2023 | Yordanov et al. |

FOREIGN PATENT DOCUMENTS

| | | | |
|---|---|---|---|
| EP | 3 587 087 | A1 | 1/2021 |
| JP | 2010265931 | A * | 11/2010 |
| KR | 2014-0108345 | | 9/2014 |
| WO | WO 2000/057102 | A1 | 9/2000 |
| WO | WO 2007/110399 | A2 | 10/2007 |
| WO | WO 2020/223666 | A1 | 11/2020 |
| WO | WO 2022/235947 | | 11/2022 |

OTHER PUBLICATIONS

EHA Composite Machinery GmbH Brochure, in 10 pages.
International Search Report and Written Opinion issued in PCT Application No. PCT/US2022/027890, mailed Aug. 22, 2022, in 8 pages.
JEC Connect, "The new machine concept for the large-scale pressure vessel", Jun. 2021, in 4 pages.
Roth Composite Machinery GMBH, "Press release—Aerospace: Roth Filament Winding Plant for the manufacture of Ariane 6 boosters", Jun. 26, 2018, in 7 pages.

* cited by examiner

COMPOSITE INTERWOVEN GAS CONTAINMENT ASSEMBLIES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57. For example, the present application is a continuation of PCT/US2022/027890, filed May 5, 2022, which claims priority to U.S. Provisional Patent Application No. 63/201,667, filed May 7, 2021 each of which is incorporated herein by reference in its entirety.

BACKGROUND OF THE INVENTION

Field of the Invention

This disclosure relates to gas cylinder assemblies having a liner and reinforcement structure to provide a high pressure rating gas cylinder, a lower cost high durability gas cylinder, and/or other gas containment structures.

Description of the Related Art

Gas cylinders can be configured as pressure vessels and as fuel tanks for compressed natural gas (CNG) and can be used to store hydrogen in transportation applications. Such tanks may be categorized into four different types. Type 3 and Type 4 tanks designs employ metal and polymer liners, respectively, and a fiber reinforcement. The fiber reinforcement includes filament wrapped layers to provide the structural reinforcement. Unlike other tank types, a Type 4 tank is not subject to corrosion, is lighter per unit volume stored, and costs less to fabricate.

Wrapping fiber reinforced filaments over a liner is a complex process. When the tank is pressurized, the load in the radial direction is much greater than the load in the axial direction. As a result, the fiber must provide reinforcement in the radial direction that is greater than that provided in the axial direction. The difference in reinforcement is achieved by providing one winding pattern of the fiber in the central cylindrical section of the tank and a different winding pattern over domed ends of the tank.

To provide these winding patterns, conventional tank processing involves transitioning from a central section winding pattern to a domed end winding pattern. In one technique the transition is achieved by cutting the fiber filaments being wound for radial reinforcement at the end of the central section. Then, an end section pattern winding can be started by connecting a free end of fiber filament to the tank, reorienting the fiber filament, and then winding the end pattern about the tank. This approach is impractical in mass production. In another technique, the transition is achieved by, within the limits of friction, slowly steering the fiber angle from a high angle in the central section to a lower angle in the end section pattern. However, this approach involves winding more material than structurally necessary, which adds weight, thickness/diameter, wind time, and cost.

SUMMARY OF THE INVENTION

Improvements in fiber winding techniques in the production of gas cylinders, such as pressure vessels and fuel tanks, and other gas containment assemblies including pipes are needed to provide practical, production volume ready processes and to reduce product compromises. These product compromises can arise due to the limitations of winding pattern transitions. Improvements can be achieved by simultaneously winding hoop strands and helical strands to achieve an interwoven structure. This approach can provide improved reinforcement per unit weight using a same or different material for hoop strands and helical strands.

In some applications, a winding apparatus can be provided that allows independent application of hoop strands and helical strands to facilitate interweaving. Preferably the winding apparatus can facilitate simultaneously winding with different materials and/or different compositions of a material to provide an interwoven structure with more strength where needed and less excess fiber where lower strength is sufficient.

In one example, a gas containment assembly, such as a pipe or pressure vessel, can include a liner reinforced by a single three dimensional interwoven layer. The inner surface of the single three dimensional interwoven layer can be in direct contact with the outside surface of the liner. The outer surface of the single three dimensional interwoven layer can form an outer surface of the fully formed tank. In some cases, the outer surface of the fully formed tank is also painted or otherwise finished but in such cases no additional structural layer is needed.

A method of interweaving primarily hoop strands and primarily helical strands can provide a composite structure without any discrete boundaries between discrete layers formed of different stiffness materials or of different stiffness compositions of materials. Such a structure is believed to be much more durable than a layered structure with respect to delamination and/or at certain angles of impact or direction of impact forces.

In another embodiment a method is provided in which a form (e.g., a metal or polymeric liner, a pipe liner, a mandral, and/or a removable form) is mounted to a spindle. The form is rotated using the spindle. While the form is rotating, a first filament of a first material is wound in a primarily hoop direction. While the first filament is wound, simultaneously winding a second filament in a primarily helical direction. The simultaneously winding of the first filament and the second filament provides an interwoven structure disposed about and reinforcing the form. If the form is a liner, the form can be integrated into the finished product, e.g., into a pressure vessel or pipe assembly. In some methods, the form is removable such that the inner layer of the filaments forms a free surface, e.g., the inside, of the structure.

In some methods, winding of the first and second filaments is controlled independently by a first carriage having a first eye in a first configuration (e.g., angle relative to a meridian of the liner) and a second carriage having a second eye in a second configuration (e.g., angle relative to a meridian of the liner). The first and second carriages can be controlled to proceed through multiple passes over the liner or other form creating a three dimensional structure that is interwoven in each pass and without discrete strain boundary layers portion of the reinforcement layer applied by subsequent passes.

In some methods, winding the first filament and simultaneously winding the second filament is performed with at least one of the first filament and the second filament being continuous, e.g., from an inner boundary of a complete reinforcement structure to an outer boundary of the complete reinforcement structure. As used herein a complete reinforcement structure is one that is strong enough for the application and need not include surface finish, paint or other layers outside the reinforcement structure.

In some methods, winding the first filament comprises adjusting a first eye of a winding apparatus over a first range of angles relative to a meridian of the liner (or more generally the form) and simultaneously winding the second filament comprises adjusting a second eye of the winding apparatus over a second range of angles relative to the meridian of the liner (or more generally the form). In some approaches, the first range of angles do not overlap the second range of angles. The first range of angles can correspond to a primarily hoop direction and the second range of angles correspond to a primarily helical direction. The first range of angles can be between about 80 degrees and about 100 degrees. The second range of angles can be between about 20 degrees and about −20 degrees.

In one embodiment, a pressure vessel or more generally a gas containment assembly such as a pipe is provided that has a structural shell formed by filament winding upon a substantially cylindrical form. The form can be a lightweight, e.g., polymeric, liner in some embodiments. The form can be a metal liner in some embodiments. The form can be removable in some embodiments. The structural shell has a first filament and a second filament. The first filament includes of a first material. The first filament is wound about the form in a primarily hoop direction. The second filament includes a second material. The second material is different from the first material. The second filament is wound about the form in a primarily helical direction. The first filament and second filament are interwoven in a layer upon the form.

In another embodiment, a pressure vessel or more generally a gas containment assembly such as a pipe assembly is provided that includes a substantially cylindrical form (e.g., a polymeric liner, a lightweight liner, a lightweight polymeric liner, a metal liner, a pipe liner, a mandral, and/or a removable form), a first filament, and a second filament. The first filament is wound about the form in a primarily hoop direction. The second filament is wound about the form in a primarily helical direction. The first filament and second filament are woven upon the form such that a first portion of the first filament is disposed over the second filament and a second portion of the first filament is disposed under the second filament. As used herein, one filament is under the other if a length thereof is between the other filament and the liner in a radial direction of the pressure vessel.

The first filament and the second filament can be a same material. If the first and second filaments are of the same material, the composition of the first and second filament can be the same. The first and second filament can be of the same material, but the first and second filaments can have different material properties. For example, the first filament and the second filament can comprise the same material but the first filament can be configured with greater strength. The first and second filament can comprise different materials, e.g., carbon reinforced filament and glass reinforced filament.

BRIEF DESCRIPTION OF THE DRAWINGS

Features of the invention can be better understood from the following detailed description when read in conjunction with the accompanying schematic drawings, which are for illustrative purposes only. The drawings include the following figures.

DETAILED DESCRIPTION OF THE PREFERRED EMBODIMENT

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

This application discloses novel gas cylinders and methods of and apparatuses for producing the same. As used herein "cylinder" is a term that includes storage tanks, pressure vessels and other containers that can be used to store a gas and is not necessarily limited to a specific shape such as a right cylinder and/or having a constant or unvarying circular shape in cross-section. The novel apparatuses and methods produce an interwoven structure of first fibers wound in a first direction with second fibers wound in a second direction. The winding process yields a three dimensional structure of interwoven fibers which avoids discrete boundary layers, particularly boundary layers in stiffness, within the structure. The three dimensional structure of interwoven fibers can be formed continuously, e.g., by continuous strands of fibers, avoiding cutting fibers or dwelling to transition between layers. By eliminating such boundary layers, the reinforcement structure avoids certain failure modes while at the same time achieving high pressure ratings in some embodiments, high durability in some embodiments, and both high pressure ratings and high durability in some embodiments.

Figure 1:
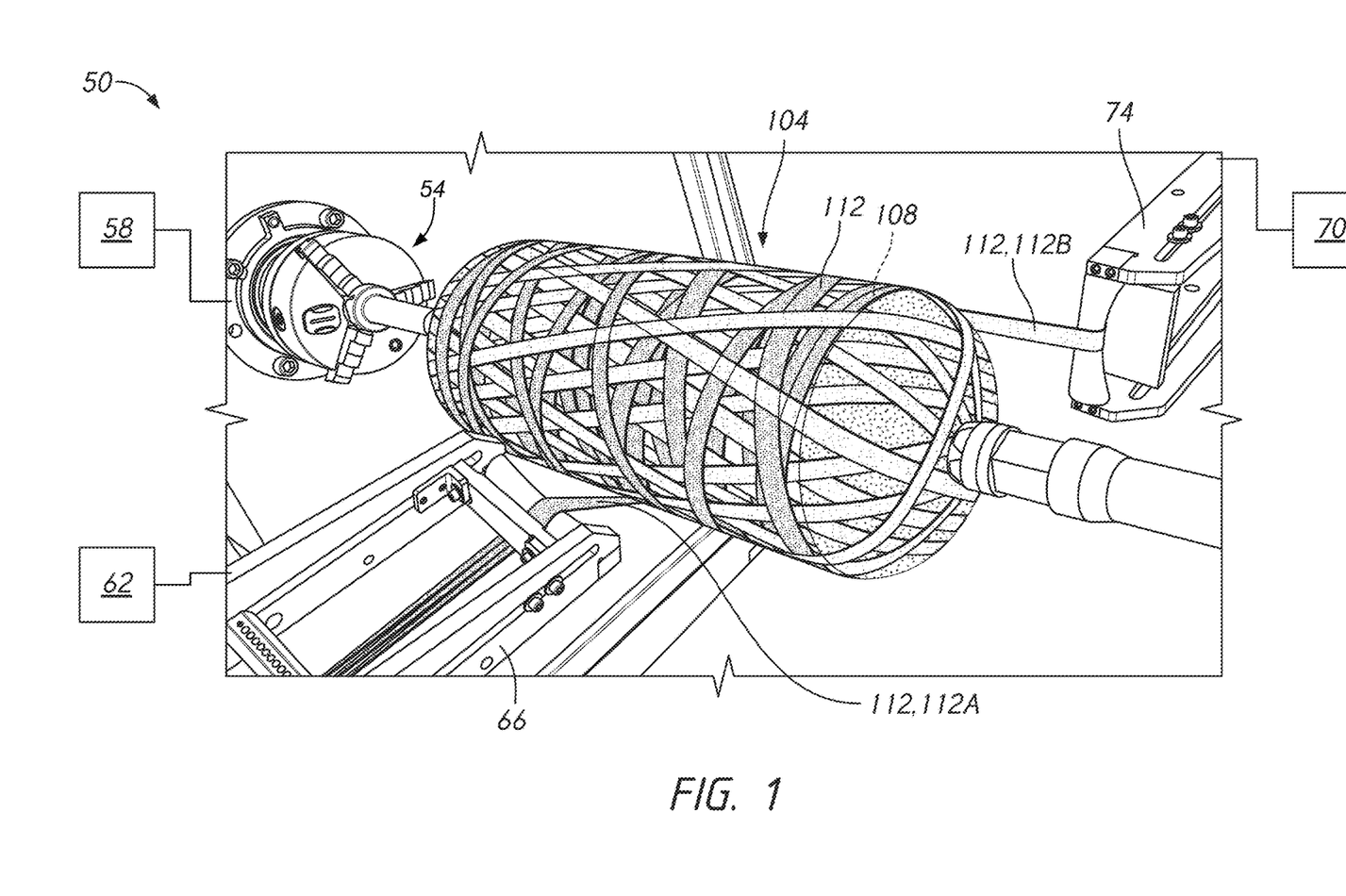
FIG. 1 shows a portion of a process of forming an improved gas cylinder, e.g., pressure vessel or fuel tank, using multiple winding eyes in a dual carriage winding apparatus.

FIG. 1 shows a winding apparatus 50 and a pressure vessel 100 being produced thereby. The winding apparatus 50 is a dual carriage apparatus. This disclosure is not limited to dual carriage and can extend to more than to two carriages in other examples of multiple carriage implementations. The winding apparatus 50 is configured to produce the pressure vessel 100 with interwoven filaments. The interwoven filaments are formed by simultaneous winding filaments using multiple carriages that can be independently controlled. The winding apparatus 50 includes a spindle 54 upon which a structural shell 104 can be produced. The structural shell 104 can include a substantially cylindrical form or liner 108. The liner 108 can be formed of polymer with a lightweight structure and is sometimes referred to herein as a lightweight liner. Other cylindrical forms could be used on the winding apparatus 50 for other applications. The spindle 54 includes a rotating chuck or similar apparatus that can support the liner 108 as it rotates about a longitudinal axis thereof. The rotation of the spindle 54 can be provided by a motor 58 mechanically coupled therewith.

The winding of filaments about the liner 108 can be performed by carriages of the winding apparatus 50. The winding apparatus 50 can include a first carriage 62 having a first eye 66 and a second carriage 70 having a second eye 74. The first carriage 62 can be disposed on one side of the spindle 54. The first carriage 62 can be moved along the side of the space in which the spindle 54 supports the liner 108. The movement of the first carriage 62 allows the filament to be applied to the liner 108 in a first pattern. For example, the first carriage 62 can be configured to spool out through the first eye 66 a filament 112 well suited to provide primarily radial support to the liner 104. The first eye 66 can spool out a first filament 112A comprising a first material composition or first configuration. The first filament 112A can be a hoop filament.

The second carriage 70 can be spaced apart from the first carriage 62 and configured to move along the space where the liner 108 can be supported. The second carriage 70 can be disposed on an opposite side of the liner 108 from the first carriage 62 when the liner 108 is mounted to the spindle 54. The second carriage 70 can be configured to move independently of the first carriage 62. The second carriage 70 can orient the second eye 74 to spool out a second filament 112B. The second filament 112B can comprise a second material composition that is different from the first material composition in some applications. The second filament 112B can have a configuration that makes it well suited to be used as a helical filament. In some applications the second filament 112B comprises the same material as the first filament 112A. In some applications the second filament 112B includes the same material or materials as the first filament 112A. When formed of the same material or materials as the first filament 112A, the second filament 112B can be of the same or a different configuration. For example, the first filament 112A could have a high strength configuration (e.g., high strength carbon fiber material configuration with a strength at or over about 700 ksi, about 800 ksi, about 900 ksi, about 1000 ksi, about 1100 ksi, about 1200 ksi, about 1300 ksi, or strength in any range defined by any combination of the foregoing numbers as end points) and the second filament 112B could be of a lower or low strength configuration (e.g., a low or lower strength carbon fiber material configuration with a strength at or over about 300 ksi, about 400 ksi, about 500 about ksi, about 600 ksi or about 650 ksi or strength in any range defined by any combination of the foregoing numbers as end points or a glass fiber material with a strength of about 300 ksi). More generally, other materials than carbon fiber suitable for fiber wrapping as described herein with strength properties within the foregoing ranges for high strength configuration other than carbon fiber also can be used for the first filament 112A. Materials other than carbon and glass fiber suitable for fiber wrapping as described herein with strength properties within the foregoing ranges for lower or low strength configuration also can be used for the first filament 112A.

Figure 2:
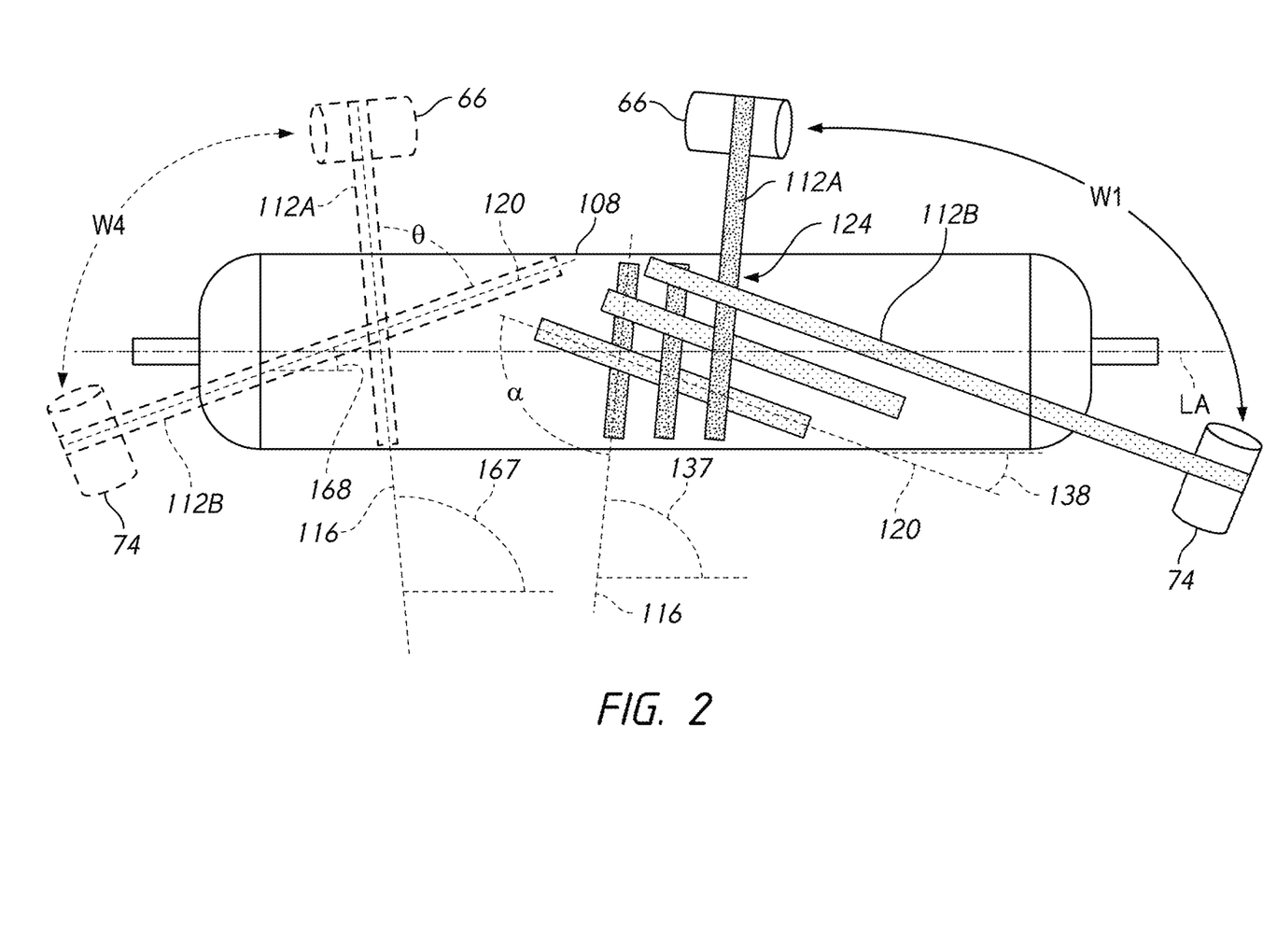
FIG. 2 is a schematic diagram further illustrating the winding apparatus of FIG. 1 and methods of winding filaments therewith.

FIG. 2 shows further details of the winding apparatus 50 and the process of manufacturing the structural shell 104. The liner 108 is shown in a side view. As discussed above, the liner 108 is supported by the spindle 54 for rotation about a longitudinal axis LA thereof. The winding apparatus 50 is controlled to move the first eye 66 and the second eye 74 to various positions along the liner 108. Two such positions are seen in FIG. 2. In particular, a winding position W1 is seen in solid lines in which the first eye 66 is controlled to spool out the first filament 112A in a primarily hoop direction 116. The primarily hoop direction 116 is a direction in which the longitudinal axis of the first filament 112A is oriented in a direction close to perpendicular to a meridian of the liner 108. The primarily hoop direction 116 in the winding position W1 can correspond to a hoop angle 137 between 60 and 90 degrees from a meridian (e.g., a line parallel to the longitudinal axis LA) of the liner 108. In some cases, the primarily hoop direction 116 corresponds to a hoop angle 137 between 70 and 90 from a meridian of the liner 108. In some cases, the primarily hoop direction 116 corresponds to a hoop angle 137 between 80 and 90 from a meridian of the liner 108.

In some cases, the primarily helical direction 120 corresponds to a helical angle 138 between about −20 degrees and about 0 degrees of a meridian of the liner 108 where negative degrees are measured as an angle between a first line extending from an origin at the left of the longitudinal axis and extending toward the right and a second line, such as the primarily helical direction 120, in the clockwise direction. The primarily helical direction 120 can correspond to a helical angle 138 between about −10 degrees and about 0 degrees of a meridian of the liner 108. The primarily helical direction 120 correspond to a hoop angle 137 between about −5 degrees and about 0 degrees of a meridian of the liner 108.

FIG. 2 shows three strands of the first filament 112A oriented toward the right at hoop angle 137. These three strands appear to be separate strands, but would normally be segments of a continuous first filament 112A that would extend around the liner 108, each segment separated from an adjacent segment by a small distance as shown. The distance between adjacent segments of the first filament 112A depends on several factors, including the rotational speed of the spindle 54 (and therefor the liner 108), the speed of movement of the first carriage 62, and the thickness of the first filament 112A. Similarly, the second filament 112B appears to be three separate strands oriented with right side ends angled downward relative to left side ends and being below the position of the longitudinal axis LA. These strands would normally be adjacent segments of a continuous second filament 112B wrapped around the liner 108. The spacing between adjacent segments of the second filament 112B would be a function of the rotational speed of the liner 108, the speed of movement of the second carriage 70, the orientation of the second eye 74, and the thickness of the second filament 112B.

The second filament 112B is wound about the liner 108 at the same time as the first filament 112A forming the interwoven structure discussed herein. The first carriage 62 and the first eye 66 would have a pre-defined orientation to the liner 108 in the winding position W1. The second carriage 70 and the second eye 74 also have a pre-defined orientation to the liner 108 in the position W1. In other words, the winding position W1 defines to orientation of both of the first eye 66 and the second eye 74 at the particular moment of winding seen in FIG. 2. The winding position W1 can define an orientation of the first eye 66 producing a primarily hoop direction 116 and an orientation of the second eye 74 producing a primarily helical direction 120. In some cases, other winding positions can be provided along a central length of the liner 108 that provide negative helical angles 138 and hoop angles 137 less than ninety degrees. These angles can vary randomly within each pass. These angles can vary in a predefined manner within each pass. These angles can vary in a predefined manner from a first pass to subsequent passes.

FIG. 2 shows a winding position W4, which corresponds to another winding condition or configuration of the winding apparatus 50. In the winding position W4 the first carriage 62 and the second carriage 70 are moved such that the first filament 112A and the second filament 112B are spooled out at different angles from those of the winding position W1. The first carriage 62 is moved along the longitudinal axis of the liner 108 to a position spaced apart from the position of the first carriage 62 in the winding position W1. The first eye 66 is oriented to a hoop angle 167. The hoop angle 167 can be between about 90 and about 120 degrees from a meridian of the liner 108. In some cases, the primarily hoop direction 116 corresponds to a hoop angle 167 between about 110 and about 90 from a meridian of the liner 108. In some cases, the primarily hoop direction 116 corresponds to a hoop angle 167 between about 100 and about 90 from a meridian of the liner 108.

The winding position W4 provides in some cases that the primarily helical direction 120 corresponds to a helical angle 168 between about 0 and about 20 degrees from a meridian of the liner 108. The primarily helical direction 120 can correspond to a helical angle 168 between about 0 and about 10 degrees of a meridian of the liner 108. The primarily helical direction 120 can correspond to a position between about 0 and about 5 degrees of a meridian of the liner 108. The winding position W4 can vary in the operation of the winding apparatus 50. For example, a portion of the winding of the liner 108 can have a first combination of hoop angle 167 larger than 90 degrees and a helical angle 168 larger than 0 degrees and a second portion of the winding of the liner 108 can have another combination of hoop angle 167 larger than 90 degrees and a helical angle 168 larger than 0 degrees.

Other winding positions are possible between the winding position W1 and the winding position W4 as discussed further below. In some cases, the first carriage 62 and the second carriage 70 move along the length of the liner 108 several time to provide for complete coverage of the liner 108 as discussed further below. As the first carriage 62 and second carriage 70 move the winding position W1 and the winding position W4 can vary such that the angles of the first filament 112A and the second filament 112B to the meridian or to each other vary over the length of the structural shell 104.

FIG. 2 shows that the winding process results in a woven or interwoven structure of the first filament 112A and the second filament 112B. The process enables continuous strands of the filament 112 and the second filament 112B to achieve complete coverage of the liner 108 without requiring cutting of the first filament 112A to allow the filament 112 to be reoriented to a primarily helical direction. The location of the first filament 112A can be limited to the portion of the liner 108 requiring more radial reinforcement. Also, the second filament 112B can be configured for the purpose of supporting the liner 108 against axial loads. The second filament 112B need not be reoriented to a primarily hoop direction, which would require inefficient use of material and also would constrain the possible movements of the second carriage 70 and the second eye 74.

FIG. 2 shows that as the first carriage 62 and the second carriage 70 progress in the winding position W1, a single turn of the second filament 112B will pass over and under adjacent strands of the first filament 112A. In particular, the middle segment of the second filament 112B is seen to pass over the left two segments of the first filament 112A and to pass under the right-most segment of the first filament 112A depicted. This provides an interwoven or woven configuration of the second filament 112B and the first filament 112A. The same can be said for the first filament 112A. The middle segment of the first filament 112A can be seen to pass under the upper two segments of the second filament 112B while passing over the lower-most segment of the second filament 112B. This provides an interwoven or woven configuration of the first filament 112A and the second filament 112B. These over-under arrangements of the first filament 112A and the second filament 112B provide uniformity in material properties, in particular of stiffness, across the expanse of a layer 128 in the radial direction as a three dimensional interwoven construct is formed, as discussed further below.

The winding position W1 produces a first braid angle α. The first braid angle α can be about 90 degrees, about 95 degrees, about 100 degrees, about 105 degrees, about 110 degrees, or within a range defined by any two of the foregoing end points, between first filament 112A in a primarily hoop direction 116 and an adjacent woven second filament 112B in a primarily helical direction 120. The winding position W4 produces a fourth braid angle θ between the primarily helical direction 120 and the primarily hoop direction 116. The fourth braid angle θ can be about 90 degrees, about 95 degrees, about 100 degrees, about 105 degrees, about 110 degrees, or within a range defined by any two of the foregoing end points, between a first filament 112A in a primarily hoop direction 116 and an adjacent woven second filament 112B in a primarily helical direction 120. In one embodiment, the fourth braid angle θ in the winding position W4 is the same as the first braid angle α in the winding position W1.

Figure 3A:
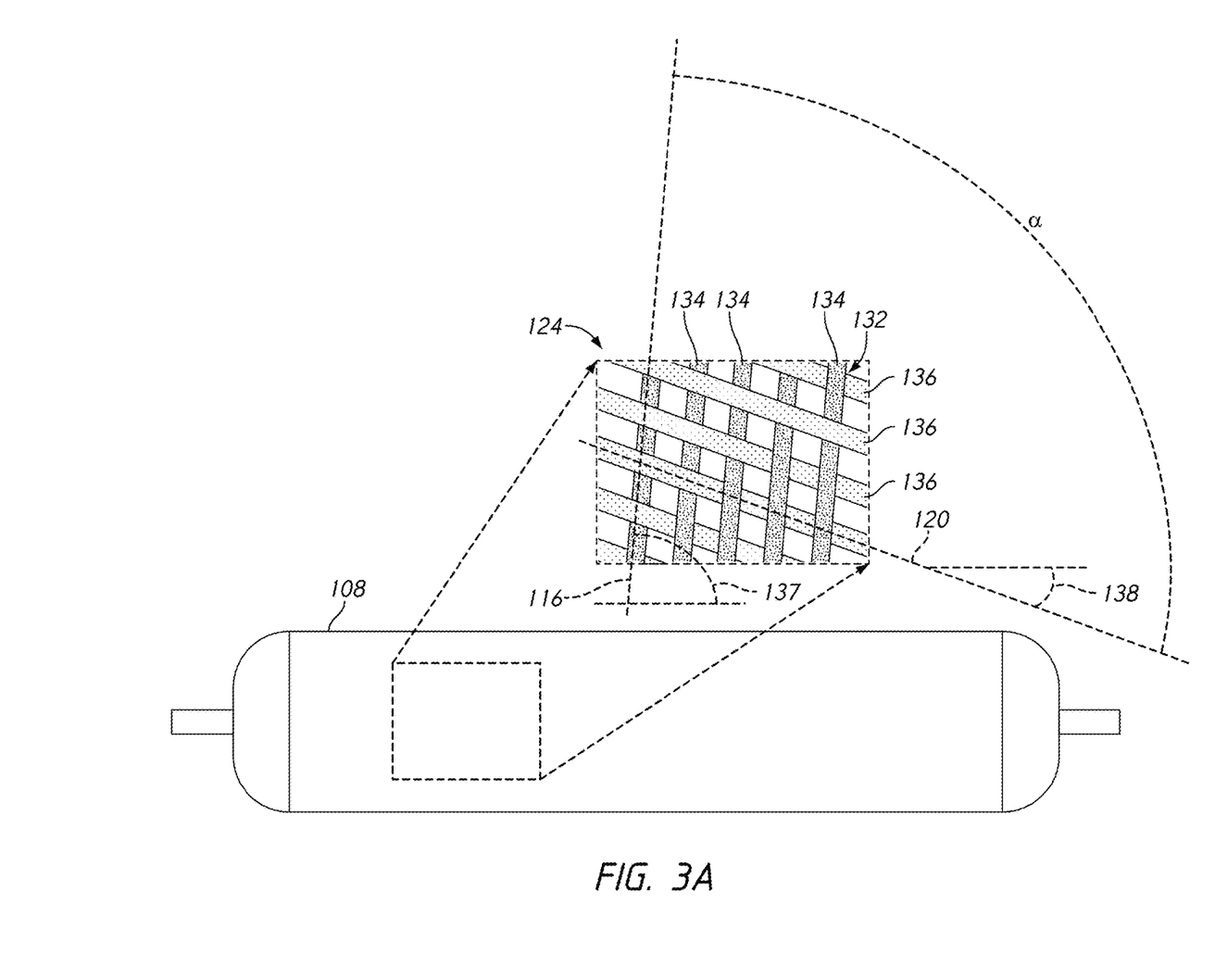
FIG. 3A is a schematic view of the gas cylinder seen in FIG. 1 with a portion of a woven structure shown in detail.

FIGS. 3A-3D show four portions of a woven structure 124 in which the first filament 112A and the second filament 112B are interwoven in a layer 128 upon the liner 108. FIG. 3A shows a portion of the woven structure 124 in which first interweave hoop strands 134 of the first filament 112A are oriented at a hoop angle 137 and the first interweave helical strands 136 of the second filament 112B are oriented at a helical angle 138. The hoop angle 137 comprises an angle less than 90 degrees from a meridian of the liner 108. The helical angle 138 comprises a negative angle, e.g., about −20 degrees measured counter-clockwise from a meridian of the liner 108. Other values of the hoop angle 137 and the helical angle 138 are discussed above. In one embodiment a first braid angle α is defined between adjacent braided segments of the continuous filaments 112A, 112B. The first braid angle α is about 100 degrees in one embodiment, e.g., by virtue of the hoop angle 137 being about 80 degrees and the helical angle 138 being about negative 20 degrees. Other values of the first braid angle α are discussed above. The foregoing woven structure 124 forms a first interweave 132 between adjacent braided strands.

Figure 3B:
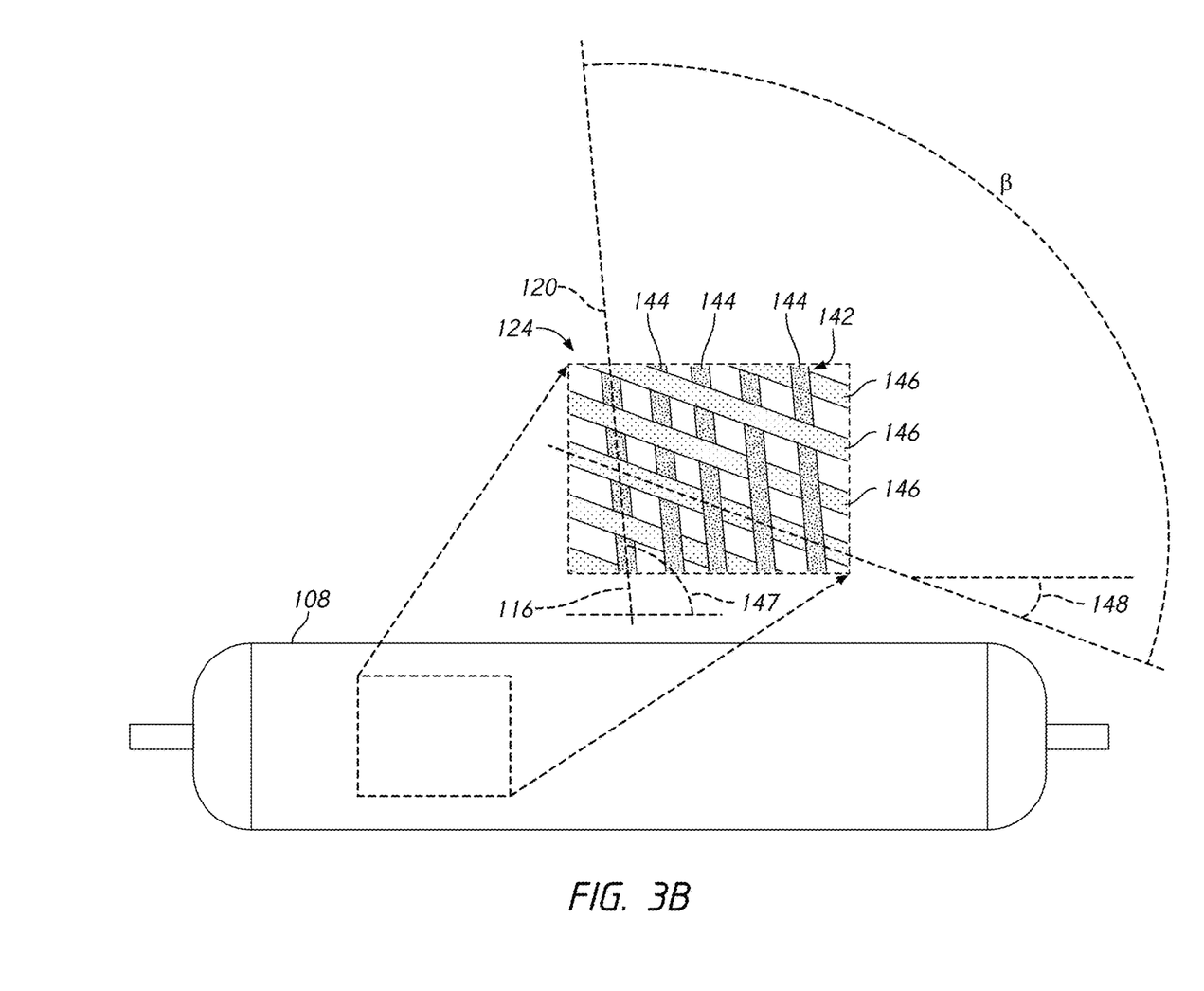
FIG. 3B is a schematic view of the gas cylinder seen in FIG. 1 with another portion of a woven structure shown in detail.

FIG. 3B shows another portion of the woven structure 124 in which second interweave hoop strands 144 of the first filament 112A are oriented at hoop angle 147 and second interweave helical strands 146 of the second filament 112B are oriented at helical angle 148. The hoop angle 147 can comprise an angle more than 90 degrees from a meridian of the liner 108, e.g., about 95 degrees, about 100 degrees, about 105 degrees, about 110 degrees, about 115 degrees about 120 degrees, or within a range including any of the foregoing as end points. The helical angle 148 comprises a negative angle, that is measured counter-clockwise from a meridian of the liner 108. The helical angle 148 can be the same as any of the examples of the helical angle 138. In one embodiment a second braid angle β is defined between adjacent braided segments of the continuous filaments 112A, 112B. The second braid angle β can be about 130 degrees in one embodiment, e.g., by virtue of the hoop angle 147 being about 110 degrees and the helical angle 148 being about negative 20 degrees. Other second braid angles β are possible by combination of the foregoing example values for the hoop angle 147 and the helical angle 148. The foregoing woven structure 124 forms a second interweave 142 between adjacent braided strands.

Figure 3C:
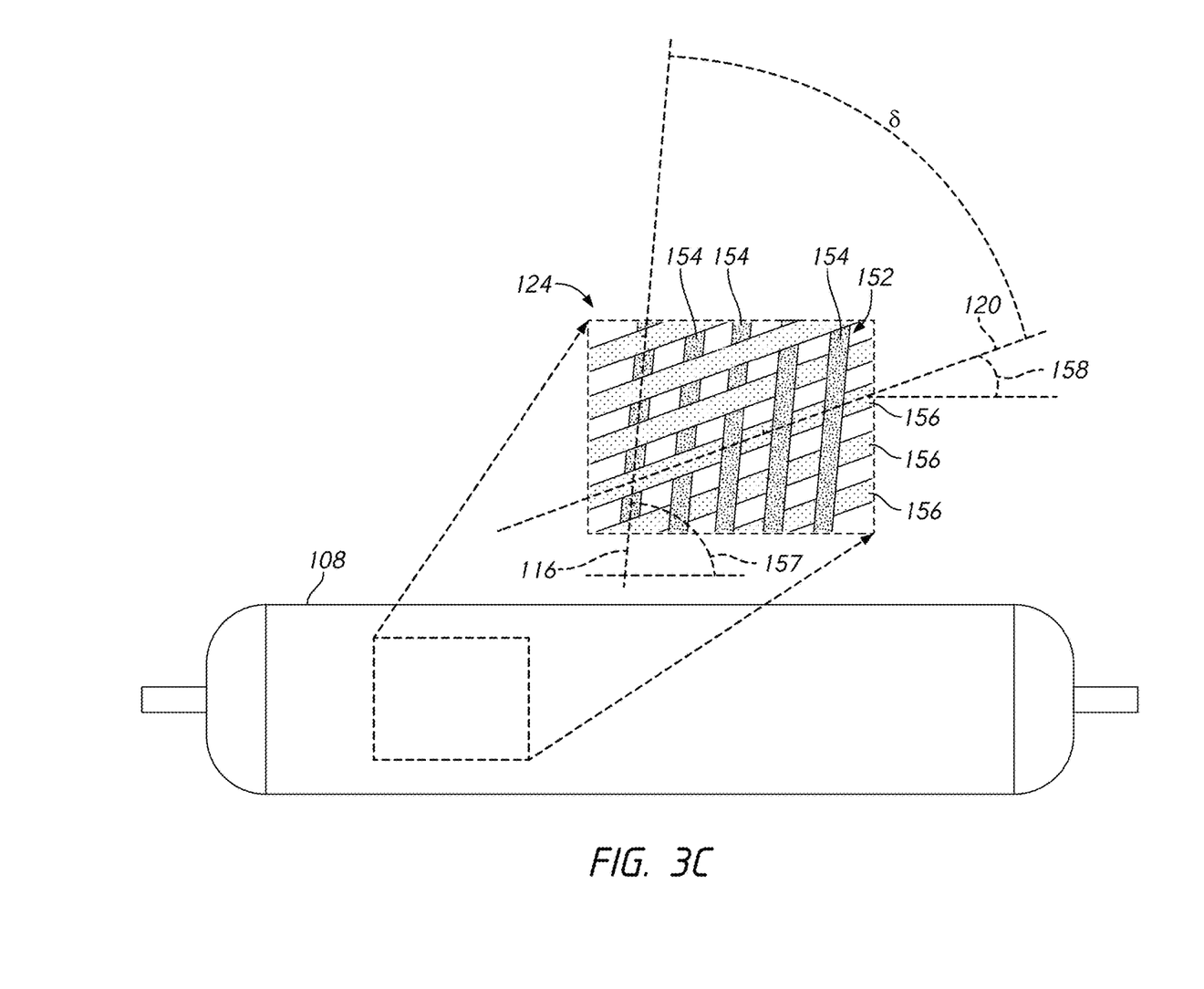
FIG. 3C is a schematic view of the gas cylinder seen in FIG. 1 with another portion of a woven structure shown in detail.

FIG. 3C shows another portion of the woven structure 124 in which third interweave hoop strands 154 of the first filament 112A are oriented at hoop angle 157 and third interweave helical strands 156 of the second filament 112B are oriented at helical angle 158. The hoop angle 157 comprises an angle less than 90 degrees from a meridian of the liner 108. The hoop angle 157 can be any of the angles discussed above in connection with the hoop angle 137. The helical angle 158 can comprise a positive angle. In one embodiment a third braid angle δ is defined between adjacent braided segments of the continuous filaments 112A, 112B. The third braid angle δ can about 60 degrees in one embodiment, e.g., by virtue of the hoop angle 157 being about 80 degrees and the helical angle 158 being about 20 degrees. The helical angle 158 can be the absolute values of any of the angles discussed above in connection with the helical angle 138. The third braid angle δ can be any combination of angles disclosed in connection with the hoop angle 157 and the helical angle 158. The foregoing woven structure 124 forms a third interweave 152 between adjacent braided strands.

Figure 3D:
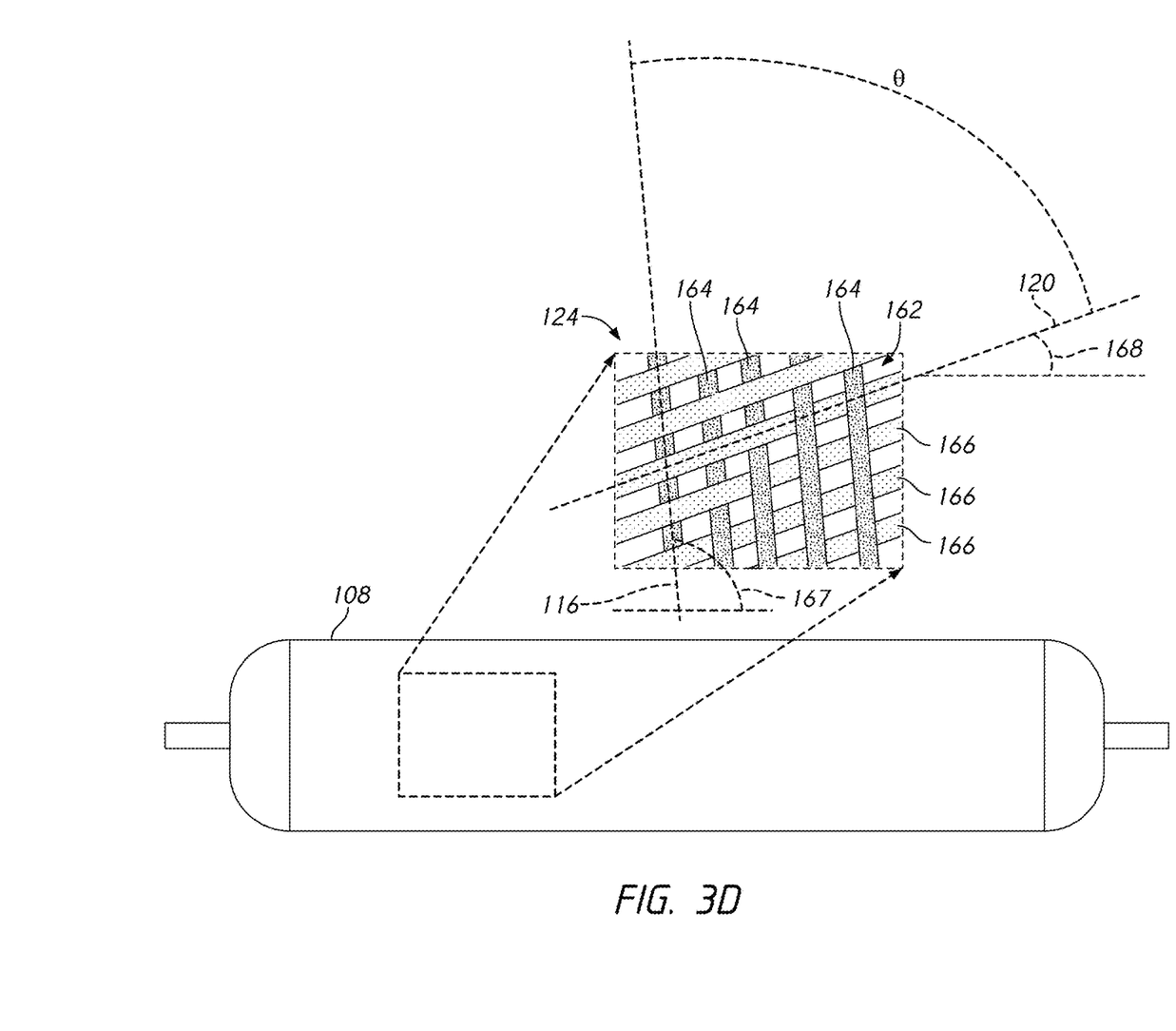
FIG. 3D is a schematic view of the gas cylinder seen in FIG. 1 with another portion of a woven structure shown in detail.

FIG. 3D shows another portion of the woven structure 124 in which fourth interweave hoop strands 164 of the first filament 112A are oriented at hoop angle 167 and fourth interweave helical strands 166 of the second filament 112B are oriented at helical angle 168. The hoop angle 167 comprises an angle greater than 90 degrees from a meridian of the liner 108. The hoop angle 167 can be a value corresponding to any value disclosed in connection with the hoop angle 147. The helical angle 168 comprises a positive angle, e.g., any of the values disclosed in connection with the helical angle 158. In one embodiment a fourth braid angle θ is defined between adjacent braided segments of the continuous filaments 112A, 112B. The fourth braid angle θ can be about 90 degrees in one embodiment, e.g., by virtue of the hoop angle 167 being about 110 degrees and the helical angle 168 being about 20 degrees. Other values of the fourth braid angle θ can be determined by combinations of the values disclosed in connection with the hoop angle 167 and the helical angle 168. The foregoing woven structure 124 forms a fourth interweave 162 between adjacent braided strands.

The first interweave 132, the second interweave 142, the third interweave 152, and the fourth interweave 162 could each result from a discrete winding position. For example, the first interweave 132 corresponds to the winding position W1 and the fourth interweave 162 corresponds to the winding position W4. Although four distinct winding positions can generate the four interweaves illustrated in FIGS. 3A-3D, a winding method can include more than four winding positions. The winding angle of the first filament 112A and the second filament 112B can vary from the highest to the lowest winding angles for the primarily hoop direction 116 and the primarily helical direction 120 respectively. In some cases, a number of turns can be provided in a winding position, followed by one or more turns in a different winding position to adjust the angle approaching a boundary condition of the pressure vessel 100, such as an edge of a structure, an inflection point, or a physical feature.

Figure 4:
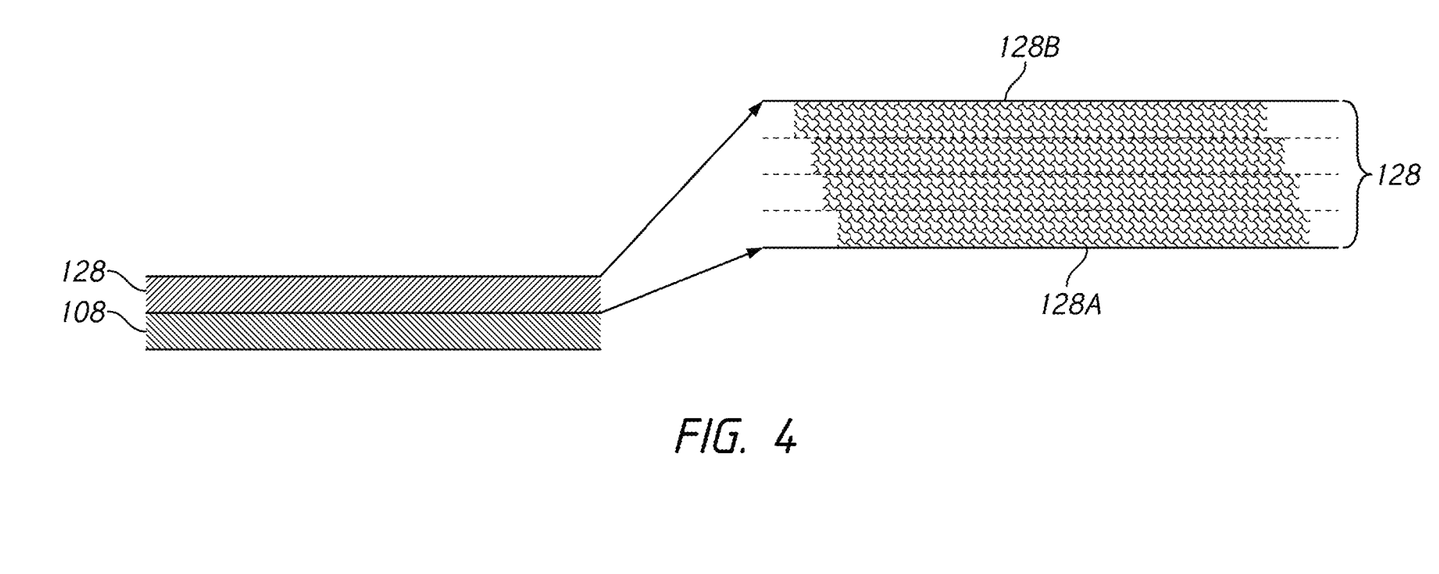
FIG. 4 is a cross-sectional view of a portion of a gas cylinder produced by the winding apparatus and method illustrated in FIGS. 1-3D.

FIG. 4 shows a schematic cross-section of a wall of the pressure vessel 100. In one embodiment, the innermost cavity of the pressure vessel 100 is surrounded by an inner wall of the liner 108. The liner 108 can be lightweight polymeric liner, as discussed above. The outer surface of the liner 108 can be surrounded by a layer 128 that comprises a three dimensional interwoven construct. The layer 128 is formed by two to thirty, in some cases six to twenty, e.g., fifteen passes of the first carriage 62 and the second carriage 70 of the winding apparatus 50 along the liner 108 as the liner 108 is rotated by the spindle 54. Each pass can apply one to ten, in some cases two to eight, e.g., four, five, six, or seven loops of the first filament 112A in the primarily hoop direction 116. Each pass can apply one to ten, in some cases two to eight, e.g., four, five, six, or seven loops of the second filament 112B in the primarily helical direction 120. In each pass and for each revolution of the liner 108 the second filament 112B are woven with the first filament 112A, e.g., causing each arcuate segment of the first filament 112A to pass under one or more and over one or more (e.g., a plurality of) successive segments of the second filament 112B and/or causing each arcuate segment of the second filament 112B to pass under one or more and over one or more (e.g., a plurality of) successive segments of the second filament 112B. The result is a continuous layer 128 of braided reinforcement. The layer 128 is a three dimensional interwoven construct because each pass of the first carriage 62 and the second carriage 70 cause the first eye 66 and the second eye 74 to build additional woven thickness to the initial thickness applied to the outer surface of the liner 108. The stiffness of the structural shell 104 is uniform in a radial direction through the layer 128 due to the first filament 112A and the second filament 112B being present at the same proportions at various radial positions of the layer 128.

The continuous nature of the layer 128 is illustrated by FIG. 4 which shows a solid line at an inner surface boundary at an innermost portion 128A of the layer 128 and a solid line at an outer surface boundary at an outermost portion 128B of the layer 128 without discrete boundary layers between the inner and outermost portions. The dashed lines on FIG. 4 illustrate that the entire thickness of the layer 128 can be a result of many passes of the first carriage 62 and the second carriage 70 across the liner 108. However, the winding process results in a bulk of continuous material without stiffness property boundaries between these winding passes. The winding process disclosed herein also avoids discrete boundaries between areas where filaments are oriented only primarily in a hoop direction without any filament in the primarily helical direction and adjacent areas where filaments are oriented only in primarily helical direction without any filament in the primarily hoop direction. Although the dash lines suggest that the layer 128 may be built up with four passes of the first carriage 62 and the second carriage 70, the number of passes can be any number including fifteen or more passes to fully enclose the liner 108 in supportive filaments.

One example application of the foregoing is in the production of a hydrogen gas cylinder that can be used in fuel cell vehicles and other applications using hydrogen gas. In this application, the pressure vessel 100 is configured to sustain a 700 bar pressure in operation without failing. The first filament 112A comprises a high strength carbon fiber material wound in a primarily hoop direction or directions as discussed above. The second filament 112B also comprises a carbon fiber material that is wound in a primarily helical direction or directions as discussed above. In one embodiment the first filament 112A and the second filament 112B include fibers with the same reinforcement capability, e.g., are formed with the same material composition and may be identical fibers. The first filament 112A and the second filament 112B both contribute to the radial load support, though the second filament 112B contributes more to axial load support. In some cases, the second filament 112B can be a lower performance (e.g., lower strength) configuration of carbon fiber. By interweaving the fibers, the production of the hydrogen gas cylinder can be completed quickly. This is at least in part due to reducing or eliminating the need to transition fibers between hoop and helical direction, either by cutting the fiber or by varying the winding angle from hoop to helical angles. The interwoven structure provides uniform stiffness even when the material properties of the filaments 112A, 112B vary.

Another example application of the foregoing is in the production of a lower cost and in some cases higher durability gas cylinder for CNG storage. In this approach, the first filament 112A can be configured with a high strength material. The second filament 112B can be configured with a lower strength (same or different) material. The first filament 112A can comprise high strength carbon fiber. The second filament 112B can comprise a lower strength material, e.g., glass fiber. The lower strength of glass fiber requires winding more material than structurally necessary. In particular the glass fiber is thicker than the carbon fiber. The additional material provides a weight penalty. However, the overall cost may be lower because glass fiber is less costly than carbon fiber. Also, glass fibers are more durable and have a higher resistance to fire. Furthermore, being thicker, glass fibers are also less sensitive to surface damage, such as cuts and abrasion from handling. Lower stiffness glass is also less prone to unravel if damaged. Thicker end portions also are more resistant to drop-impact damage. This may enable the carbon-glass version of the pressure vessel 100 to be shipped without additional foam "bumpers" which are held on by glue and which are added to protect cylinder.

Another example application of the foregoing is in the production of a pipe assembly. In this assembly, a form such as a pipe liner can be provided. The pipe liner can be similar to the liner 108. Unlike the pressure vessel 100, the pipe assembly may not be enclosed at the ends of the liner. This preserves the function of the pipe assembly to convey gasses and other fluids. The pipe assembly can incorporate the first filament 112A which can be configured with a high strength material. The second filament 112B can be configured with the same material or a lower strength (same or different) material. The first filament 112A can comprise high strength carbon fiber. The second filament 112B can also comprise high strength carbon fiber or a lower strength material, e.g., lower strength carbon fiber or a glass fiber. Interweaving the first filament 112A and the second filament 112B in a pipe assembly can provide high burst pressure performance. Interweaving the first filament 112A and the second filament 112B in a pipe assembly can provide fast throughput compared to other winding techniques.

Embodiments disclosed herein provide one or more of the following advantages. Significant cost savings can be realized by using a lower cost fiber for fibers wound in one direction, e.g., for the second filament 112B wound in the primarily helical direction 120. As discussed above, the second filament 112B can comprise glass fibers and/or lower strength carbon fibers as two examples of materials that can be used for the second filament. These fibers may be significantly lower cost than the first filament 112A wound in the primarily hoop direction 116, which in some case have higher strength configurations. As discussed above, some fibers (e.g., glass fibers) used for the second filament 112B may be thicker and thus may result in thicker end sections of the pressure vessel 100. The thicker end section may enable the elimination of strategies to improve drop test performance and/or other metrics of durability. This can reduce or eliminate the cost, weight, and manufacturing process associated with providing bumpers or other durability enhancements. In addition, glass fiber provides the additional benefit of being non-conductive and thus providing galvanic isolation with metallic bosses. Metallic bosses are integrated into the pressure vessel 100 in some embodiments, e.g., for connecting to piping outside the pressure vessel 100 and/or for mechanical support of the pressure vessel 100. Lower stressed fibers, e.g., glass fibers, are less subject to fragmentation should the pressure vessel 100 burst. Thus, providing such fibers in a portion of the pressure vessel 100, e.g., throughout the thickness, at the outer surface, etc., of the domed ends of the pressure vessel 100 enhances containment of materials on burst.

As discussed above, simultaneously winding fiber in the primarily hoop direction 116 and the primarily helical direction 120 can eliminate the need to transition between these directions where a single eye/single carriage is provided. These and other benefits of simultaneous winding enables the winding apparatus 50 to increase through-put, reduce winding times, and/or increase production capacity compared to winding hoop and helical layers in series or as wholly separate layers. In some cases, the layer 128 can provide a three dimensional interwoven structure. The outer surface of the layer 128 may be at the outer surface of the pressure vessel 100. In some embodiments, a complete winding of first filament 112A may be provided to provide conventional appearance with the other benefits of the pressure vessel 100 discussed above. In additional to providing conventional appearance, this additional finish layer may enable the use of other production system in place for tank winding approaches that rely more on transitions, e.g., automated squeegees, sanding and other further gas cylinder processing.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A pressure vessel comprising:
    a liner having a cylindrical center portion and two domed portions; and
    a structural shell being disposed directly around the liner, and comprising:
        a first filament wound about the liner in a primarily hoop direction; and
        a second filament wound about the liner in a primarily helical direction;
    wherein the first filament and second filament are interwoven in a layer upon the liner, the layer comprises a three-dimensional interwoven construct, the layer is disposed directly around the cylindrical center portion and the two domed portions, and the layer comprises a continuous expanse from an outer surface of the cylindrical center portion of the liner to an outer surface of the pressure vessel without layer boundaries therebetween,
    the first filament and the second filament cross over each other at a first angle in a first portion of the three-dimensional interwoven construct, and the first filament and the second filament cross over each other at a second angle in a second portion of the three-dimensional interwoven construct, the first angle being about 90 degrees and the second angle being about 110 degrees.

2. The pressure vessel of claim 1, wherein the first filament comprises a first material composition and the second filament comprises a second material composition.

3. The pressure vessel of claim 2, wherein the first material composition comprises carbon fiber.

4. The pressure vessel of claim 2, wherein the second material composition comprises glass fiber.

5. The pressure vessel of claim 2, wherein the first material composition comprises carbon and provides higher strength and the second material composition comprises carbon and provides lower strength.

6. The pressure vessel of claim 1, wherein the layer is a single three-dimensional interwoven layer.

7. The pressure vessel of claim 1, wherein the first filament and the second filament are continuously wound from at least the outer surface of the cylindrical center portion of the liner to the outer surface of the pressure vessel, using continuous strands of fibers and avoiding cutting fibers.

8. The pressure vessel of claim 1, wherein the first filament is wound about the liner from a first direction and the second filament is wound about the liner from a second direction opposite the first direction.

9. The pressure vessel of claim 1, wherein the layer does not have stiffness property boundaries between winding passes.

10. The pressure vessel of claim 1, wherein the layer is without discrete boundaries between areas where the first filament is oriented in the primarily hoop direction without any second filament in the primarily helical direction, or where the second filament is oriented in the primarily helical direction without any first filament in the primarily hoop direction.

11. The pressure vessel of claim 1, wherein the outer surface of the layer comprises the outer surface of the pressure vessel, without an additional layer of the first filament or the second filament disposed around the layer.

12. The pressure vessel of claim 1, wherein the first filament has a first configuration and the second filament has a second configuration different from the first configuration.

13. The pressure vessel of claim 1, wherein the first filament and the second filament have a same configuration.

14. A pressure vessel comprising:
a liner having a cylindrical center portion and two domed portions; and
a structural shell being disposed directly around the liner, the structural shell comprising:
a reinforcement layer being disposed directly around the cylindrical center portion and the two domed portions of the liner, and comprising a first filament and a second filament interwoven upon the liner to form a three-dimensional interwoven construct, the first filament wound about the liner in a primarily hoop direction and the second filament wound about the liner in a primarily helical direction, and
wherein the first filament and the second filament cross over each other at a first angle in a first portion of the three-dimensional interwoven construct, and the first filament and the second filament cross over each other at a second angle in a second portion of the three-dimensional interwoven construct, the first angle being about 90 degrees and the second angle being about 110 degrees, and
wherein the first filament and the second filament are present in the reinforcement layer at the same proportions at various radial positions of the reinforcement layer from an outer surface of the liner to an outer surface of the pressure vessel.

15. The pressure vessel of claim 14, wherein the first filament comprises a first material composition and the second filament comprises a second material composition.

16. The pressure vessel of claim 15, wherein the first material composition comprises carbon fiber.

17. The pressure vessel of claim 15, wherein the second material composition comprises glass fiber.

18. The pressure vessel of claim 15, wherein the first material composition comprises carbon and provides higher strength and the second material composition comprises carbon and provides lower strength.

19. The pressure vessel of claim 14, wherein the reinforcement layer comprises a continuous expanse from an outer surface of the liner to an outer surface of the reinforcement layer without layer boundaries therebetween.

20. The pressure vessel of claim 14, wherein the reinforcement layer is a single three-dimensional interwoven layer.

21. The pressure vessel of claim 14, wherein the first filament and the second filament are continuously wound from at least the outer surface of the cylindrical center portion of the liner to the outer surface of the pressure vessel, using continuous strands of fibers and avoiding cutting fibers.

22. The pressure vessel of claim 14, wherein the first filament is wound about the liner from a first direction and the second filament is wound about the liner from a second direction opposite the first direction.

23. The pressure vessel of claim 14, wherein the reinforcement layer does not have stiffness property boundaries between winding passes.

24. The pressure vessel of claim 14, wherein the reinforcement layer is without discrete boundaries between areas where the first filament is oriented in the primarily hoop direction without any second filament in the primarily helical direction, or where the second filament is oriented in the primarily helical direction without any first filament in the primarily hoop direction.

25. The pressure vessel of claim 14, wherein the outer surface of the reinforcement layer comprises the outer surface of the pressure vessel, without an additional layer of the first filament or the second filament disposed around the reinforcement layer.

26. The pressure vessel of claim 14, wherein the first filament has a first configuration and the second filament has a second configuration different from the first configuration.

27. The pressure vessel of claim 14, wherein the first filament and the second filament have a same configuration.

* * * * *